United States Patent [19]

Crawford et al.

[11] 4,097,071

[45] Jun. 27, 1978

[54] FLEXIBLE EXHAUST COUPLING

[75] Inventors: Daniel G. Crawford, Dryden; Stanley E. James, Flint; Donald H. Nixon, Swartz Creek, all of Mich.

[73] Assignee: General Motors Corporation, Detroit, Mich.

[21] Appl. No.: 803,526

[22] Filed: Jun. 6, 1977

[51] Int. Cl.² .............................................. F16L 21/08
[52] U.S. Cl. ...................... 285/94; 285/187; 285/234; 285/267; 285/332.1; 285/363
[58] Field of Search ...................... 285/187, 332.1, 234, 285/263, 266, 267, 261, 268, 269, 270, 94, 271, 368, 363, 416; 60/282, 322

[56] References Cited

U.S. PATENT DOCUMENTS

| 1,915,100 | 6/1933 | McLaughlin | 285/267 X |
| 2,840,394 | 6/1958 | Ruhr | 285/226 |
| 3,047,315 | 7/1962 | Kirnison | 285/269 |
| 3,188,115 | 6/1965 | Morrish et al. | 285/187 |
| 3,798,903 | 3/1974 | Mitchell et al. | 285/187 |
| 3,985,377 | 10/1976 | Ahola | 60/322 |

Primary Examiner—Dave W. Arola
Attorney, Agent, or Firm—J. C. Evans

[57] ABSTRACT

An exhaust pipe of a front engine mounted transversely to roll about an axis transverse to the longitudinal axis of the vehicle is joined to a tailpipe by an improved high temperature resistant flexible coupling including a spherically surfaced ring seal supported between a tubular end segment of a first pipe and a free end spherical surface on a second pipe; the second pipe having a flange connected thereto and a pair of bolts are resiliently coupled to the flange fixed on the first pipe to bias the spherical lip against a high temperature lubricant surface on the seal to define a joint with minimal resistance to roll motion so that it readily accommodates substantial angular offset between the first and second pipe segments during high temperature exhaust conditions while maintaining a positively sealed surface at the joint.

4 Claims, 3 Drawing Figures

FLEXIBLE EXHAUST COUPLING

This invention relates to flexible couplings for connecting an exhaust pipe to a tailpipe and more particularly to flexible exhaust couplings for use with front engine driven vehicles having an engine mounted to roll about an axis transverse to the longitudinal axis of exhaust and tailpipe components of an automotive exhaust system.

Various proposals have been suggested to accommodate for engine roll in front mounted transverse engine applications wherein the engine rolls about an axis transverse to the longitudinal axis of an exhaust system which follows the longitudinal axis of a vehicle.

More particularly, in such arrangements, one proposal is to provide a bellows type connection between the exhaust pipe and downstream exhaust components. A flexible bellows component of the coupling is typically made of high cost temperature resistant alloy metal which contracts and expands in accordance with fore and aft engine roll to accommodate substantial angular movements produced between an exhaust pipe segment connected to the engine and a downstream exhaust pipe component connected by suitable flexible hangers to the vehicle frame.

Spherical type exhaust couplings are known such as in U.S. Pat. No. 3,188,115 issued June 8, 1965, to Morrish et al where an exhaust pipe is directly connected to the exhaust manifold by an external double spherical fitting configured to accommodate a slight angular offset between the exhaust pipe and the exhaust manifold. In such arrangements an outer spherical fitting component is spring biased against an intermediate spherical fitting to hold it on a spherical seat of the exhaust manifold. The double spherical fitting maintains a spring bias on a sealed joint between the exhaust manifold and the intermediate spherical fitting through wide temperature excursions without accommodating the constant roll movement of a transversely mounted engine as it is transmitted into a downstream, axially oriented exhaust system.

Other proposals with spherical surface on an exhaust pipe having inside and outside spherical surfaces in sandwiched relationship of limited roll freedom are set forth in U.S. Pat. No. 3,047,315 issued July 31, 1962, to Kinnison and U.S. Pat. No. 2,840,394 issued June 24, 1958, to Rohr. While all of the aforesaid coupling configurations are suitable to maintain a tightly sealed joint at exhaust manifolds and the like, they do not include provision for joint movements which will accommodate substantial angular movement between an exhaust pipe and downstream exhaust components as is found in a front located, transversely mounted engine and associated exhaust system.

Accordingly, an object of the present invention is to improve automotive exhaust systems for use with a front located transversely mounted engine by the provision therein of a low cost exhaust coupling having a flange fixedly secured to each of first and second pipes at points offset from free ends on each of the pipes and having an interposed seal element supported between the free ends and having a spherical seal surface impregnated with low friction, high temperature material to reduce frictional drag between it and a spherical joint surface on one of the free ends and wherein the flanges are interconnected by a pair of attachment bolts threaded to one flange and spring coupled to the other flange so that the spherical joint surface on one of the free ends will be continuously spring biased against the spherical seal surface and yet free to pivot with respect thereto while defining a continuous annular seal surface therebetween throughout substantial angular movements between the first and second pipes.

Still another object of the present invention is to provide a low cost, flexible exhaust coupling for use in engine exhaust systems wherein the engine is front located and transversely mounted to have a roll axle transverse to the longitudinal axis of the vehicle and wherein the exhaust system includes exhaust and tailpipe components arranged generally longitudinally of the vehicle by the provision of two pipes each having a flange fixedly connected thereon and each including a free end between each of the fixed flanges and telescoped with one another to have a space therebetween occupied by an annular seal element having a spherical end surface impregnated with a low friction, high temperature resistant material and in engagement with a spherical surface on one of the free ends and wherein each of the fixed flanges are spring biased by resilient means to accommodate substantial angular movement between the two pipes.

Yet another object of the present invention is to provide an exhaust coupling as set forth in the preceding object wherein the resilient means includes a pair of attachment bolts each threaded to one flange and oriented in the plane of the rocking motion of the engine and each coupled to the other flange by a conical spring grounded on the other of the flanges and to a shoulder on the attachment bolt to produce an axial spring bias of the one free end to the spherical end surface and a sealed interconnection between the pipes that permits a substantial angular movement between the pipes and wherein the pipes are easily moved at the coupling without binding therein.

Further objects and advantages of the present invention will be apparent from the following description, reference being had to the accompanying drawings wherein a preferred embodiment of the present invention is clearly shown.

Figure 1:
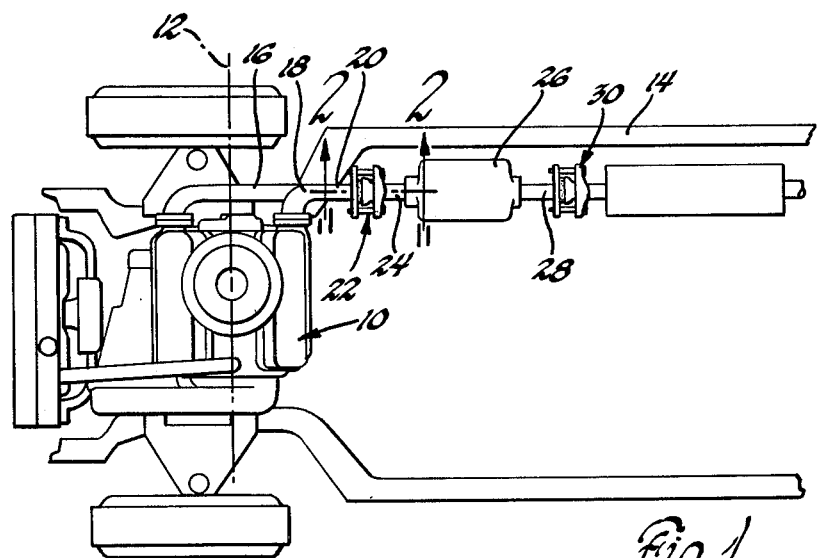
FIG. 1 is a diagrammatic view of an engine exhaust system including the present invention.

In FIG. 1, a front located, transversely mounted engine 10 is illustrated having a roll axis 12 arranged generally transversely to the longitudinal extent 14 of the vehicle.

The engine includes exhaust pipes 16, 18 joined at a single outlet pipe 20 that is joined by a coupling 22, constructed in accordance with the present invention, to a pipe 24 leading to a downstream, exhaust gas converter 26. An outlet pipe 28 from the converter 26 is connected by a second coupling 30 to downstream exhaust components.

When an engine is supported transversely in a vehicle support system including resilient engine mounts, it basically rolls about an axis transverse to the longitudinal axis of downstream pipe components of an exhaust system associated with the engine. Furthermore, such engines are susceptible to vertical displacement and yaw movements that all combine to direct a substantial rolling movement between an exhaust pipe component leading to an exhaust system and the remainder of the downstream components in the exhaust system. In such arrangements the longitudinal extent of the exhaust system must withstand bending offset and thermal expansion forces thereon while retaining a gas tight seal between the interconnected components.

Each of the exhaust couplings 22, 30 are specifically configured to accommodate bending by rocking motion of the joint and to do so by means of a unique interconnection between first and second pipe components that enable the interconnected pipe components to be freely moved through substantial angular offsets without resistance to such movement of the pipe components and to do so while maintaining a tight gas seal at a sealed joint in the coupling.

Figure 2:
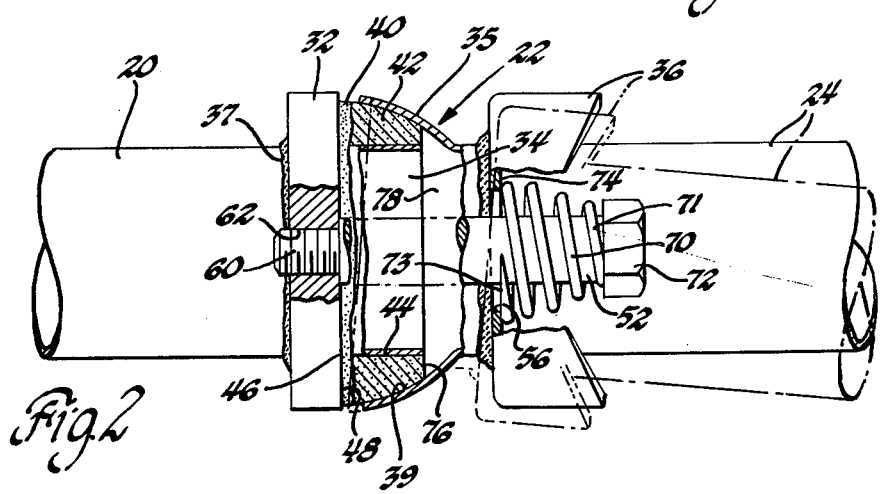
FIG. 2 is an enlarged vertical sectional view taken along the line 2—2 of FIG. 1.
Figure 3:
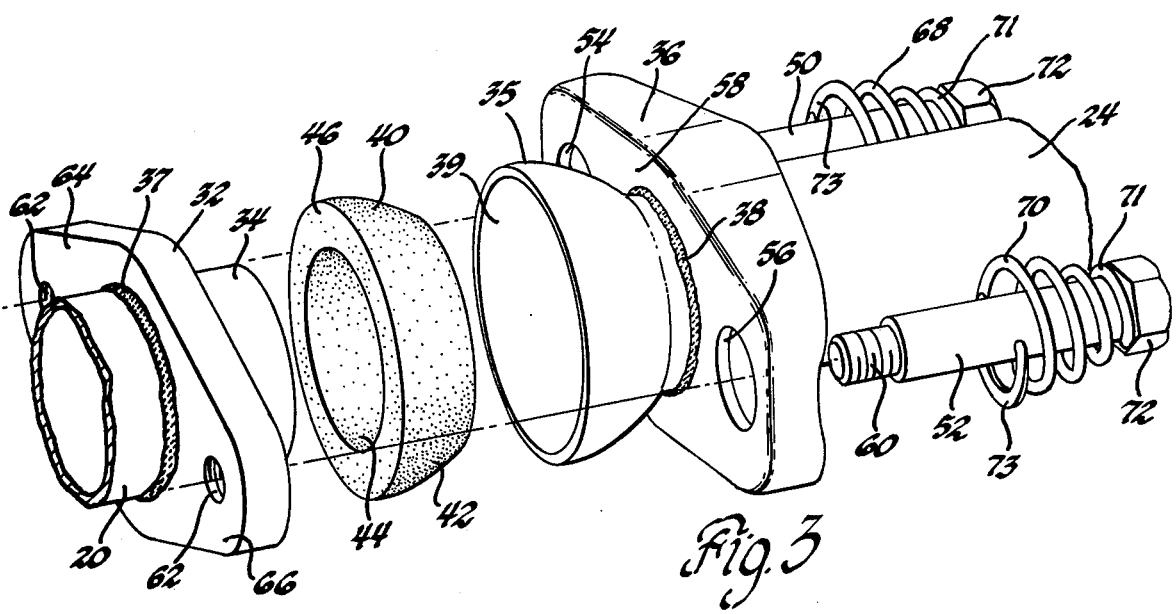
FIG 3 is a view in perspective showing the component parts of the invention in an exploded relationship.

More particularly, in the illustrated arrangement the coupling 22 is detailedly set forth in FIGS. 2 and 3 with it being understood that coupling 30 is indentical. Coupling 22 has a seal flange 32 located in surrounding relationship to the outer periphery of the exhaust pipe 20 and upstream of a free end 34 on pipe 20. Free end 34 extends inboard of the coupling 22 from the seal flange 32 and in telescoped relationship to a free end 35 on pipe 24. The flange 32 is fixedly secured to the exhaust pipe 20 by a circumferential weldment 37 that securely fastens the seal flange 32 against movement with respect to the exhaust pipe 20. Weldment 37 is continuously circumferentially formed and is of a density to be gas tight thereby to seal the flange 32 to pipe 20.

The coupling further includes a second flange 36 fixedly connected to a portion of the pipe 24 by a circumferential weldment 38 at a point spaced downstream of free end 35. Free end 35 is flared radially outwardly to form an inboard spherical seal surface 39 spaced radially of and extending circumferentially around the outer surface of free end 34.

The spherical seal surface 39 is supportingly received on a spherical surface 40 on a ring seal element 42 that is located interiorly of the coupling 22 to separate the flanges 32 and 36 from one another and to serve as a load transfer component between the free end 34 and the free end 35. More particularly, the ring seal 42 includes an axial bore 44 therethrough in which the outer surface of the pipe end 34 is inserted to support the ring seal 42 radially outwardly thereof. The ring seal 42 further includes a radially outwardly directed seal surface 46 thereon that engages an inboard shoulder 48 on the flange 32 to define a sealed joint therebetween. In one working embodiment ring seal 42 is made of compressed sheets of graphite laminated to S.A.E. 1009 steel foil. The graphite has 80% minimum type GTC graphite part density of 2.6 g/cm$^3$ + 10%.

The separated parts in FIG. 3 are joined together in the working embodiment by a pair of bolts 50, 52. The bolts 50, 52 are directed through clearance holes 54, 56, respectively, formed on either side of a front wall 58 of the flange 36. Each of the bolts 50, 52 further includes a threaded end 60 that is threadebly received within a tapped opening 62 in ear portions 64, 66 of the seal flange 32. The seal flange 32 is coupled to the key flange 36 by bolts 50, 52 and flexible spring coupling means in the form of a conical spring 68 supported in surrounding relationship to the bolt 50 and a conical spring 70 located in surrounding relationship to the attachment bolt 52. More particularly, each of the springs 68, 70 has a small diameter end 71 in engagement with a head 72 on each of the bolts 50, 52. An opposite large diameter end 73 of each spring 68, 70 is seated against the outboard face 74 of the wall 58 as best seen in FIG. 2. In the illustrated application of FIG. 1, conical springs 68, 70 are offset on either side of the coupling 22 and are located in the roll plane of the engine 10. Such an arrangement keeps a constant axial load on the sealed joint by forcing the spherical surface 39 against the spherical surface 40 of the ring seal 42. The axial load is maintained throughout angular offset movements between the pipe segments 20, 24 as produced during engine roll excursions. The springs 68, 70 are located at the base or large diameter end thereof by the inside diameter 74 of the key flange 36 and at the top by the inside diameter of the bolt head 72 so that flexing in the springs 68, 70 takes place between these two anchor points.

The free ends 34, 35 and ring seal 42 space the flanges 32, 36 apart and flange 36 is located in spaced relationship to end 35. Thus, pivotal movement of surface 39 on surface 40 is able to accommodate the roll movement of engine 10. More specifically, such movement is transmitted through the engine 10 through bolts 50, 52 and springs 68, 70 to accommodate angular offset between the free ends 34, 35.

The spherical surface 40 of the seal is preferably impregnated with a special low friction high temperature resistant lubricant such as graphite. Other low friction high temperature lubricants are equally suited for use in the present invention. The use of such lubricant is desired in order to assure reduced frictional resistance against the free rocking movement of the surface 39 with respect to the surface 40.

The illustrated seal is self-lubricating and antioxidant and will withstand temperatures in excess of 1000° F. The especially configured coupling allows the joint 22 to flex continually and yet maintain a complete circumferential seal between the annular spherical surface 39 on the free end 35 with respect to the spherical surface 40 on the seal element 42. Radial seal along the seal flange 32 is maintained by the axial force component provided by the conical springs 68, 70 as they pull the seal flange 32 and the reference shoulder 48 thereon with respect to the radial seal surface 46 of the ring seal 42. Any tendency for leakage along the outer surface of the free end 34 is sealed by the continuously formed gas tight weldment 37 between the outboard face of the seal flange 24 and the exhaust pipe 20.

Another feature of the present invention is that free end 34 protects the bore 44 and end surface 76 of ring seal 42 by directing exhuast gas in a downstream direction into cavity 78 formed by free end 35. This avoids direct impact of exhaust against surfaces of ring seal 35 and consequent erosion.

In the illustrated arrangement the coupling 30 has the same configuration as the coupling 22 and is included in the exhaust system to serve as an isolater against transmission of noise propagated in the engine 10 by vibration and exhaust gas flow therefrom before it enters the muffler 34 and downstream exhaust pipe segments connected thereto.

Working embodiments of the present invention have been endurance tested under lab conditions where the couplings maintained a gas tight seal following cycling in excess of one million cycles of plus and minus four degrees of movement between the longitudinal axes of pipe segment 20 and pipe segment 24. Such angular excursion simulates the typical angular movement produced by front located transversely mounted engines having a mount system that causes the engine to roll about an axis transverse to that of the longitudinal axis of the exhaust system. Moreover, the seals maintain an integral gas tight connection under conditions where the test couplings are subjected to an external environment with a 5 percent (5%) salt solution and abrasive dust components and where a temperature in the order of 900° F is applied.

The design has been found to have inherent abilities to flex more readily than heretofore known separate pipe coupling components and has been found to be more durable than integral bellows type metal flexible couplings for joining first and second pipe components. The illustrated arrangement is much more flexible than joint configurations having spherical surfaces of the double seal surface configuration where the spherical surfaces are effectively clamped with respect to one another. Moreover, the specifically illustrated spring configuration is such that the spring forces for maintaining radial and spherical interfaces between the component parts of the arrangement offer minimum resistance to rocking motion of the joint thereby to accommodate the roll motion of typically front located transversely mounted engine configurations.

While the embodiments of the present invention, as herein disclosed, constitute a preferred form, it is to be understood that other forms might be adopted.

The embodiments of the invention in which an exclusive property or privilege is claimed are defined as follows:

1. A flexible exhaust coupling assembly for maintaining a circumferential seal between pipe segments subject to angular movement therebetween during exhaust flow therethrough comprising: a first pipe, a seal flange supported on said first pipe, means for connecting said seal flange to said first pipe and forming a continuous circumferential gas tight seal between seal load flange and said first pipe, said first pipe having a tubular free end thereon extending axially beyond said seal flange, a second pipe having a flared free end formed continuously circumferentially therearound, said flared free end having a spherical seal surface thereon, a key flange on said second pipe at a point axially spaced from said flared free end to prevent outer radial binding of said free end, means for fixedly securing said key flange to said second pipe segment, a ring seal having an outer peripheral spherical surface thereon impregated with high temperature lubricant material in engagement with said spherical seal surface and freely movable with respect thereto, said ring seal including a radial reference surface sealingly engageable with said seal flange to be located thereby axially with respect to said first pipe, means for spring biasing said flared free end axially against said outer peripheral spherical surface, said last mentioned means including a pair of bolts each having a threaded end thereon engaged with said seal flange and each including a segment freely movable with respect to said key flange and including a heat portion axially spaced with respect to said key flange, compression spring means in engagement with said head and said key flange, said compression spring means being spaced with respect to said key flange to permit angular movement of said first pipe segment with respect to said second pipe segment, said compression spring means biasing said flared free end with respect to said spherical outer surface on said ring seal to maintain a continuous circumferential seal therearound throughout the range of angular movements between the first and second pipes.

2. A flexible exhaust coupling assembly for maintaining a circumferential seal between pipe segments subject to angular movement therebetween during exhaust flow therethrough comprising: a first pipe, a seal flange supported on said first pipe, means for connecting said seal flange to said first pipe and forming a continuous circumferential gas tight seal between seal load flange and said first pipe, said first pipe having a tubular free end thereon extending axially beyond said seal flange, a second pipe having a flared free end formed continuously circumferentially therearound, said flared free end having a spherical seal surface thereon, a key flange on said second pipe at a point axially spaced from said flared free end to prevent outer radial binding of said free end, means for fixedly securing said key flange to said second pipe segment, a ring seal having an outer peripheral surface thereon impregnated with high temperature lubricant material in engagement with said spherical surface and freely movable with respect thereto, said ring seal including a radial reference surface sealingly engageable with said seal flange to be located thereby axially with respect to said first pipe, means for spring biasing said flared free end axially against said spherical outer surface, said last mentioned means including a pair of bolts each having a threaded end thereon engaged with said seal flange and each including a segment freely movable with respect to said key flange and including a head portion axially spaced with respect to said key flange, coned spring elements having a small diameter end in engagement with said head and a large diameter end in engagement with said key flange, said coned spring elements each being spaced with respect to said key flange to permit angular movement of said first pipe segment with respect to said second pipe segment, said coned spring biasing said flared free end with respect to said outer peripheral spherical surface on said ring seal to maintain a continuous circumferential seal therearound throughout the range of angular movements between the first and second pipes.

3. A flexible exhaust coupling assembly for maintaining a circumferential seal between pipe segments subject to angular movement therebetween during exhaust flow therethrough comprising: a first pipe, a seal flange supported on said first pipe, means for connecting said seal flange to said first pipe and forming a continuous circumferential gas tight seal between seal load flange and said first pipe, said first pipe having a tubular free end thereon extending axially beyond said seal flange, a second pipe having a flared free end formed continuously circumferentially therearound, said flared free end having a spherical seal surface thereon, a key flange on said second pipe at a point axially spaced from said flared free end to prevent outer radial binding of said free end, means for fixedly securing said key flange to said second pipe segment, a ring seal having an outer peripheral spherical surface thereon impregnated with high temperature lubricant material in engagement with said spherical seal surface and freely movable with respect thereto, said ring seal having an inside bore therethrough receiving said tubular free end to overlie said ring seal for shielding said ring seal from exhaust erosion, said ring seal including a radial reference surface sealingly engageable with said seal flange to be located thereby axially with respect to said first pipe, means for spring biasing said flared free end axially against said outer peripheral spherical surface, said last mentioned means including a pair of bolts each having a threaded end thereon engaged with said seal flange and each including a segment freely movable with respect to said key flange and including a head portion axially spaced with respect to said key flange, compression spring means in engagement with said bolt and said key flange, said compression spring means being spaced with respect to said key flange to permit angular movement of said first pipe segment with respect to said second pipe segment, said compression spring means biasing said flared free end with respect to said outer peripheral spherical surface on said ring seal to maintain a continuous circumferential seal therearound throughout the range of angular movements between the first and second pipes.

4. A flexible exhaust coupling assembly for maintaining a circumferential seal between pipe segments subject to angular movement therebetween during exhaust flow therethrough comprising: a first pipe, a seal flange supported on said first pipe, means for connecting said seal flange to said first pipe and forming a continuous circumferential gas tight seal between seal load flange and said first pipe, said first pipe having a tubular free end thereon extending axially beyond said seal flange, a second pipe having a flared free end formed continuously circumferentially therearound, said flared free end having a spherical seal surface thereon, a key flange on said second pipe at a point axially spaced from said flared free end to prevent outer radial binding of said free end, means for fixedly securing said key flange to said second pipe segment, a ring seal having an outer peripheral spherical surface thereon impregnated with high temperature lubricant material in engagement with said spherical seal surface and freely movable with respect thereto, said ring seal having an inside bore therethrough receiving said tubular free end to overlie said ring seal for shielding said ring seal from exhaust erosion, said ring seal including a radial reference surface sealingly engageable with said seal flange to be located thereby axially with respect to said first pipe, means for spring biasing said flared free end axially against said spherical outer surface, said last mentioned means including a pair of bolts each having a threaded end thereon engaged with said seal flange and each including a segment freely movable with respect to said key flange and including a head portion axially spaced with respect to said key flange, coned spring elements having a small diameter end in engagement with said head and a large diameter end in engagement with said key flange, said coned spring elements each being spaced with respect to said key flange to permit angular movement of said first pipe segment with respect to said second pipe segment, said coned spring biasing said flared free end with respect to said outer peripheral spherical surface on said ring seal to maintain a continuous circumferential seal therearound throughout the range of angular movements between the first and second pipe segments.

* * * * *

UNITED STATES PATENT AND TRADEMARK OFFICE
CERTIFICATE OF CORRECTION

PATENT NO. : 4,097,071
DATED : June 27, 1978
INVENTOR(S) : Daniel G. Crawford, Stanley E. James & Donald H. Nixon It is certified that error appears in the above—identified patent and that said Letters Patent are hereby corrected as shown below:

<u>In the ABSTRACT</u>, line 9, after "flange" insert -- by coned springs and the bolts are threaded to a seal flange --

Column 3, line 16, "indentical" should be -- identical --,

Column 3, line 56, "threadebly" should be -- threadably --,

Signed and Sealed this

Seventeenth Day of July 1979

[SEAL]

Attest:

LUTRELLE F. PARKER
*Attesting Officer*     *Acting Commissioner of Patents and Trademarks*